(12) United States Patent
Wilbur et al.

(10) Patent No.: US 9,697,051 B2
(45) Date of Patent: Jul. 4, 2017

(54) METHOD AND APPARATUS FOR PROVIDING SERVICES VIA CLOUD-BASED ANALYTICS

(75) Inventors: Alex Wilbur, Burlington, MA (US); Vishwanathan Krishnamoorthy, Andover, MA (US)

(73) Assignee: Nokia Technologies Oy, Espoo (FI)

( * ) Notice: Subject to any disclaimer, the term of this patent is extended or adjusted under 35 U.S.C. 154(b) by 724 days.

(21) Appl. No.: 13/169,624

(22) Filed: Jun. 27, 2011

(65) Prior Publication Data

US 2012/0331050 A1 Dec. 27, 2012

(51) Int. Cl.
*G06F 9/50* (2006.01)
(52) U.S. Cl.
CPC .................. *G06F 9/5072* (2013.01)
(58) Field of Classification Search
USPC .......................................................... 709/204
See application file for complete search history.

(56) References Cited

U.S. PATENT DOCUMENTS

| | | | |
|---|---|---|---|
| 8,078,397 B1* | 12/2011 | Zilka ............................ | 701/414 |
| 2003/0185365 A1* | 10/2003 | Mansfield ............... | H04M 1/56 379/142.01 |
| 2004/0003042 A1 | 1/2004 | Horvitz et al. | |
| 2007/0010942 A1 | 1/2007 | Bill | |
| 2008/0167015 A1 | 7/2008 | Vishwanathan | |
| 2009/0281718 A1 | 11/2009 | Gibran et al. | |
| 2010/0015976 A1* | 1/2010 | Issa et al. .................. | 455/435.1 |
| 2010/0125599 A1* | 5/2010 | Cheng et al. ................. | 707/771 |
| 2010/0131948 A1 | 5/2010 | Ferris | |
| 2010/0269164 A1 | 10/2010 | Sosnosky et al. | |
| 2011/0022642 A1 | 1/2011 | deMilo et al. | |
| 2011/0098029 A1 | 4/2011 | Rhoads et al. | |
| 2011/0116536 A1 | 5/2011 | Tsuie | |
| 2011/0246213 A1* | 10/2011 | Yarvis et al. .................. | 705/1.1 |

FOREIGN PATENT DOCUMENTS

WO WO 2011/002777 A2 1/2011

OTHER PUBLICATIONS

Kettler, "Cloud Based User Agent," Apr. 25, 2011, pp. 1-3.
International Search Report for related International Patent Application No. PCT/FI2012/050631 dated Dec. 3, 2012, pp. 1-5.
Written Opinion for related International Patent Application No. PCT/FI2012/050631 dated Dec. 3, 2012, pp. 1-9.
Office Action for corresponding European Patent Application No. 12803717.3-1957 dated Jan. 15, 2016, 11 Pages.

* cited by examiner

*Primary Examiner* — Angela Nguyen
(74) *Attorney, Agent, or Firm* — Ditthavong & Steiner, P.C.

(57) ABSTRACT

An approach is provided for providing services via cloud based analytics. An analytics platform determines one or more data propagation policies associated with propagating user information from at least one device to one or more cloud components. The analytics platform also processes and/or facilitates a processing of the one or more data propagation policies to cause, at least in part, a propagation of the user information to the one or more cloud components, wherein the propagation causes, at least in part, the user information to be available to one or more applications, one or more services, or a combination thereof.

20 Claims, 11 Drawing Sheets

METHOD AND APPARATUS FOR PROVIDING SERVICES VIA CLOUD-BASED ANALYTICS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate webs of information with their own locally agreed semantics without necessarily conforming to an unobtainable, global whole.

Furthermore, in addition to information, the information spaces may be combined with webs of shared and interactive computations or computation spaces consisting of a multitude of devices so that each device, as parts of the computation spaces, can have the information in the information space manipulated within the computation space environment, which may include devices other than the device, and the results delivered to the device, rather than the whole process being performed locally in the device. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). However, despite the fact that information and computation presented by the respective spaces can be distributed with different granularity, still in certain example implementations achieving scalable high context information processing within such heterogeneous environments is a challenging task.

For example, in various embodiments, a computation cloud can provide and/or recommend various services to a device user, by analyzing user information (e.g., using analytics, algorithms, etc.) However, the device may only receive the benefits of cloud services and recommendations when it directly interacts with the web services.

In one embodiment, under some circumstances, there may be no possibility for a device to connect to a cloud. For example, congestion, limited signaling capabilities (lack of network) or even cost issues (data charges when roaming) may prohibit the ability to form a live connection with the cloud. However, the user data within the device is potentially rich with insight into consumer behavior. If the user data can be distributed (propagated) to the cloud, at the time of connection, it can be mined and analyzed at the cloud for future insights which enable preemptive recommendations to the device user based on future events.

SOME EXAMPLE EMBODIMENTS

Therefore, there is a need for an approach for providing services via cloud based analytics, wherein the user experience can be tailored by the cloud without having to re-deploy the device software. If the presentation of analytics data is based on cloud algorithms then a device manufacturer can change the user experience that an end user sees, simply by updating or improving upon cloud based algorithms, without a need for device software redeployment.

According to one embodiment, a method comprises determining one or more data propagation policies associated with propagating user information from at least one device to one or more cloud components. The method also comprises processing and/or facilitating a processing of the one or more data propagation policies to cause, at least in part, a propagation of the user information to the one or more cloud components, wherein the propagation causes, at least in part, the user information to be available to one or more applications, one or more services, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more data propagation policies associated with propagating user information from at least one device to one or more cloud components. The apparatus is also caused to process and/or facilitate a processing of the one or more data propagation policies to cause, at least in part, a propagation of the user information to the one or more cloud components, wherein the propagation causes, at least in part, the user information to be available to one or more applications, one or more services, or a combination thereof.

According to another embodiment, a computer-readable storage medium carries one or more sequences of one or more instructions which, when executed by one or more processors, cause, at least in part, an apparatus to determine one or more data propagation policies associated with propagating user information from at least one device to one or more cloud components. The apparatus is also caused to process and/or facilitate a processing of the one or more data propagation policies to cause, at least in part, a propagation of the user information to the one or more cloud components, wherein the propagation causes, at least in part, the user information to be available to one or more applications, one or more services, or a combination thereof.

According to another embodiment, an apparatus comprises means for determining one or more data propagation policies associated with propagating user information from at least one device to one or more cloud components. The apparatus also comprises means for processing and/or facilitating a processing of the one or more data propagation policies to cause, at least in part, a propagation of the user information to the one or more cloud components, wherein the propagation causes, at least in part, the user information to be available to one or more applications, one or more services, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing services via cloud based analytics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
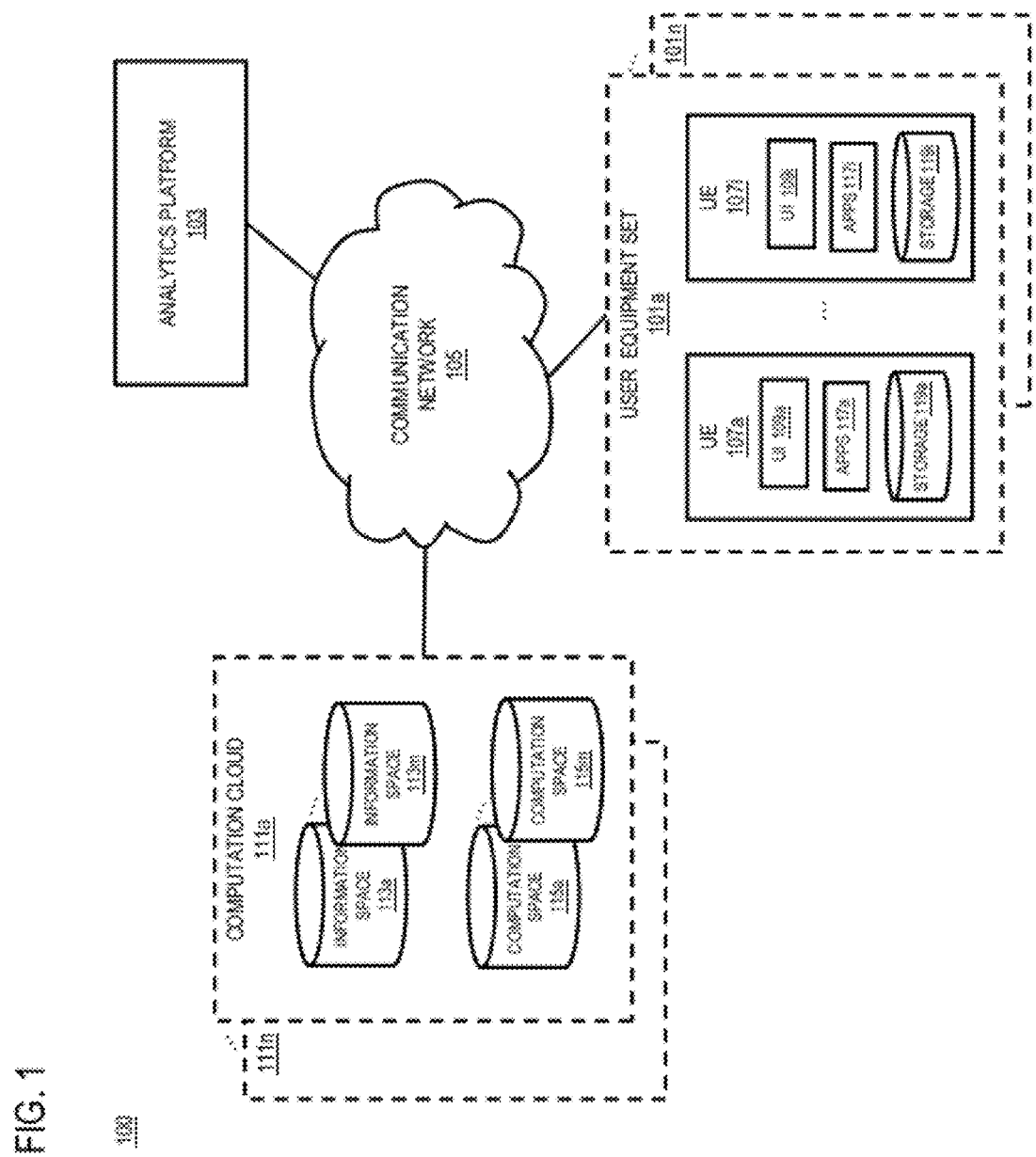
FIG. 1 is a diagram of a system capable of providing services via cloud based analytics, according to one embodiment.

FIG. 1 is a diagram of a system capable of providing services via cloud based analytics, according to one embodiment. Computation clouds can provide and/or recommend various services to a device user, by analyzing user information (e.g., using analytics, algorithms, etc.) However, the user (e.g., the device) is responsible for seeding the cloud with user/device specific information which is subsequently analyzed according to a set of analytics (e.g., recommendation algorithms). The cloud then provides relevant (user specific) content to the device which is subsequently rendered by a user interface (UI) of the device.

Typical recommendation solutions are web-based and used, for example, for vertical (domain-oriented) use cases such as serving recommended friends/contacts or store items (e.g., Amazon®). While the cloud tends to analyze user-specific data, the data resides entirely within the confines of the cloud itself and thus the logical flow is to serve a recommendation when the user browses a site/front-end service. Furthermore, the user only receives the benefit of the cloud recommendations and insight when it directly interacts with the web service, either through a browser or then via a vertically integrated device application which communicates directly with the cloud infrastructure to perform a vertical use-case.

Additionally, the data already resides completely in the master system of record at all times (e.g., the cloud/service backend). This means that relevant information or seed data that is potentially relevant to the cloud recommendations and analytics infrastructure may be lost or inaccessible (because the user was not interacting with the cloud via a front-end) or then must be captured independently of the service and distributed at some future point in time on a per-service basis. This may not and generally is not possible for most merchant services because the ability to capture on-device events outside their own data domain is typically privy only to the device manufacturer.

On the other hand, in systems where user data is captured independently of the cloud, the capturing entity must ensure that the captured data is eventually propagated to the cloud analytics as input. This capturing and propagation process may occur as a live event stream, which necessitates an active network connection in the case of a remote consumer device, or some form of buffering/caching where data is collected and propagated to the cloud at such a time as connectivity becomes available. In all cases, the implementation complexity is potentially high as there are many failure scenarios to contend with, such as for example, no network availability, or limited device resources (memory, power, storage, etc.).

It is also noted that while the device is capable of performing limited internal analytics, the kinds and complexity of the analytics the device can perform in isolation is extremely limited compared with the massively scalable compute power that the cloud offers. This means that, for example, complex use cases involving many users (such as mashing up the locations of all your friends on a map) cannot be performed in a scalable way for hundreds of millions of device owners.

To address this problem, a system 100 of FIG. 1 introduces the capability to provide services via cloud based analytics. In one embodiment, the device user experience can be tailored by the cloud without having to re-deploy the device software. If the presentation of analytics data is based on cloud algorithms then a device manufacturer can change the user experience an end user sees, simply by updating or improving upon cloud-based algorithms with no device software needed to be redeployed.

In one embodiment, a generic on-device framework for data propagation and caching based on configurable policies is used to describe data types, propagation types (in relation to data types), network interaction and balancing device characteristics with the need to communicate with a remote cloud service. A device manufacturer or system provider configures the cloud with a set of policies which describe the kind of user-centric data that is to be propagated to the cloud.

As shown in FIG. 1, the system 100 comprises sets 101a-101n of user equipments (UEs) 107a-107i comprising having connectivity to the analytics platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, based on user interactions with a UE 107a-107i, relevant data that can be used to generate consumer recommendations and insight is propagated to a computation cloud 111a-111n, in accordance with policies, through a cloud interface which is independent from the data model used. The policies may be stored in local storages 119a-119i, in analytics platform 103, in information spaces 113a-113m, or a combination thereof. The cloud 111a-111n is similarly configured with policies that cause a reaction to new device data and in turn, initiate processing. Reaction strategies can be based on a notification of new device centric data or simply a background processing task which checks (e.g., polls) for the presence of new device data.

In one embodiment, the user/device specific data on UE 107a-107i can be distributed (propagated) to the cloud 111a-111n, at the time of connection, it can be mined, for example, from the information spaces 113a-113m, for future insights which enable preemptive recommendations to UE 107a-107i based on future events (such as e.g., detecting the presence of a business trip in 7 days in a calendar stored on storage 119a-119i). A future-based recommendation algorithm allows the UE 107a-107i to be pre-seeded with relevant consumer insights in accordance with future events. In one embodiment, the computations for generating the recommendations via the recommendation algorithm can be provided by the computation spaces 115a-115m. In addition or alternatively, the computations may be serialized into a data format that can also be stored in the information spaces 113a-113m.

In one embodiment, through the execution of the configured analytics algorithms, the clouds 111a-111n can generate consumer specific insights and recommendations. These recommendations can be stored within the cloud data persistence layer (e.g., information spaces 113a-113m) for future use.

In one embodiment, a UE 107a-107i is configured with policies which describe data that should be retrieved from the clouds 111a-111n. These policies are generic in the sense that they are not tightly bound to a specific recommendation implementation. Instead, such policies describe the types of cloud-originated data which should be retrieved and cached by the UE 107a-107i using caching policies. In a similar way to propagation policies, the data distribution framework of UE 107a-107i can balance the caching policies in conjunction with system characteristics (e.g., battery, network availability, etc.) and also timing-related characteristics (e.g., "how often should this type of data be refreshed, retrieved"). Furthermore, the UE 107a-107i may be configured to receive notification messages from the cloud 111a-111n, from the analytics platform 103, or a combination thereof, that enable the cloud analytics or storage infrastructure to inform the UE 107a-107i associated with a specific user, that new data is awaiting collection from the cloud 111a-111n.

In one embodiment, in accordance with policies and notification mechanism, the UE 107a-107i may retrieve and cache the recommendation data in storage 119a-119i, such that the data becomes available for disconnected offline usage by UE 107a-107i. In this way, recommendations can be served to the end-user without an active network connection, thus improving the performance of the UE 107a-

107*i* (e.g., improving standby times) and enabling continued relevancy even in disconnected scenarios.

In one embodiment, an in-device recommendations engine (e.g., an application 117*a*-117*i*, may utilize the cloud-originated recommendation data to generate live recommendations within the UE 107*a*-107*i*. In this way the cloud recommendation data simply acts as the seed for the device recommendation engine 117*a*-117*i*. In this embodiment, heavy computation can be out-sourced to the cloud 111*a*-111*n*, leveraging the cloud's scalability and processing power characteristics. However, since the cloud is not always available and does not always have the entirely up-to-date data set in any case, the UE 107*a*-107*i* can mash up (e.g., combine) any locally available relevant insights (e.g., new data which the cloud 111*a*-111*n* may not have access to in an offline scenario) with the earlier cloud-based recommendations stored in storage 119*a*-119*i*, enabling highly tailored and contextually relevant experiences to be generated by a user interface (UI) 109*a*-109*i* of UE 107*a*-107*i*. For example, due to earlier cloud-based analysis, the UE 107*a*-107*i* may be pre-seeded with the mapping details for the location of a future business meeting in another country. The UE 107*a*-107*i* itself may no longer have an active network connection due to roaming restrictions but through a local on-device recommendations algorithm 117*a*-117*i*, the UE 107*a*-107*i* may realize that the end-user is late for a meeting appointment and thus may suggest a route to get to the meeting using the pre-loaded (recommended) map data from storage 119*a*-119*i*.

By way of example, the UE 101, and the analytics platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
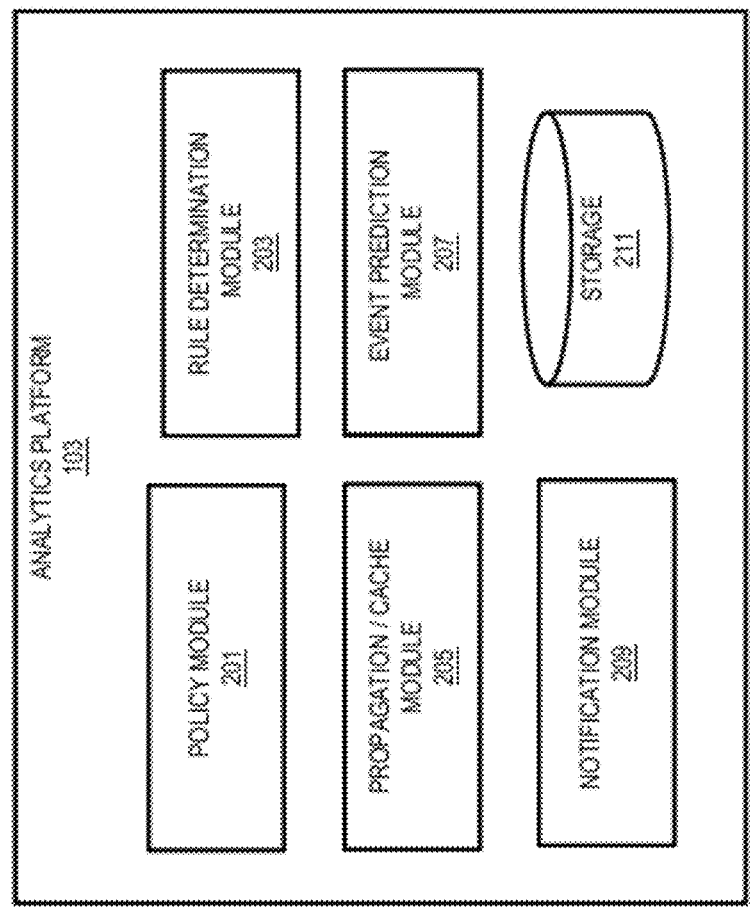
FIG. 2 is a diagram of the components of an analytics platform, according to one embodiment.

FIG. 2 is a diagram of the components of the analytics platform, according to one embodiment. By way of example, the analytics platform includes one or more components for providing services via cloud based analytics. It is contemplated that the functions of these components may be combined in one or more components or performed by other components of equivalent functionality. In this embodiment, the analytics platform 103 includes a policy module 201, a rule determination module 203, a propagation/cache module 205, an event prediction module 207, a notification module 209, and a storage 211.

Figure 3:
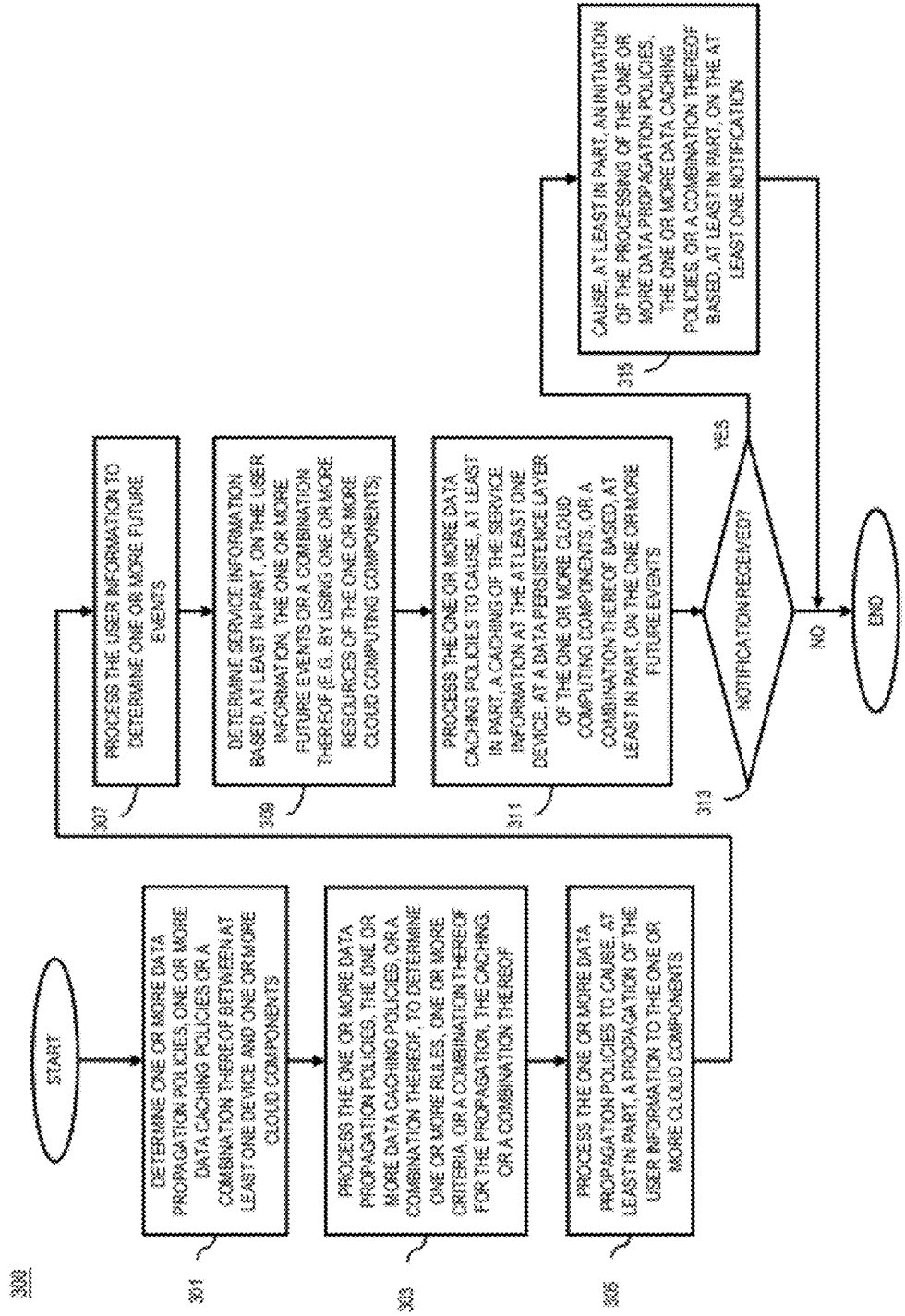
FIG. 3 is a flowchart of a process for providing services via cloud based analytics, according to one embodiment.
Figure 8:
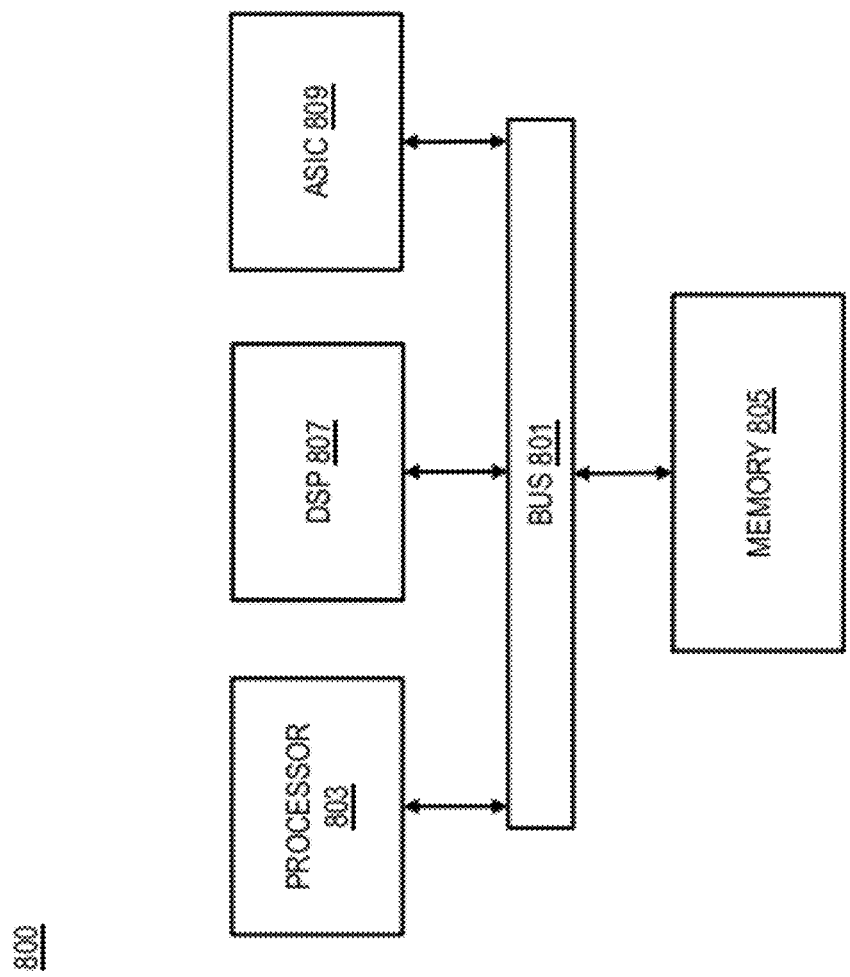
FIG. 8 is a diagram of a chip set that can be used to implement an embodiment of the invention.

FIG. 2 is described with reference to FIG. 3, wherein FIG. 3 is a flowchart of a process for providing services via cloud based analytics, according to one embodiment. In one embodiment, the analytics platform 103 performs the process 300 and is implemented in, for instance, a chip set including a processor and a memory as shown in FIG. 8.

In one embodiment, in step 301 of process 300 of FIG. 3, the policy module 201 determines one or more data propagation policies, associated with propagating user information from at least one device 107*a*-107*i* to one or more components of cloud 111*a*-111*n* (e.g., information spaces 113*a*-113*m*). The policy module 201 may also determine one or more data caching policies, associated with caching of process results from a cloud 111*a*-111*n* to at least one device 107*a*-107*i*. The policies may be retrieved by the policy module 201 from an information space 113*a*-113*m*, from the storage 211, from a storage 119*a*-119*i*, or a combination thereof.

In one embodiment, per step 303 of FIG. 3, the rule determination module 203 processes the one or more data propagation policies, the one or more data caching policies, or a combination thereof, to determine one or more rules, one or more criteria, or a combination thereof for the propagation, the caching, or a combination thereof. The rule determination module 203 determines the one or more rules, the one or more criteria, or a combination thereof based, at least in part, on one or more data types, one or more propagation types, one or more network interactions, network availability information, resource availability information, device capability information, temporal information, contextual information, or a combination thereof.

In one embodiment, per step 305 of FIG. 3, the propagation/cache module 205 processes the one or more data propagation policies to cause, at least in part, a propagation of the user information from UE 107*a*-107*i* to the one or more components of cloud 111*a*-111*n*, wherein the propagation causes, at least in part, the user information to be available to one or more applications, one or more services, or a combination thereof provided via the cloud 111*a*-111*n*. In one embodiment, the one or more data propagation policies, the one or more data caching policies, or a combination thereof are independent of the one or more applications, the one or more services, or a combination thereof.

In one embodiment, per step 307 of FIG. 3, the event prediction module 207 processes the user information propagated to the cloud 111*a*-111*n* to determine one or more future events. The future events may be determined from calendars, notes, maps, or any other user information that has been propagated to the cloud 111*a*-111*n*.

In one embodiment, per step 309 of FIG. 3, the analytics platform 103, a service provider (not shown) or a combination thereof, determine service information based, at least in part, on the user information, the one or more future events or a combination thereof, for example, by using one or more resources of the one or more cloud computing components of clouds 111a-111n.

In one embodiment, per step 311 of FIG. 3, the propagation/cache module 205 processes the one or more data caching policies determined per step 301, to cause, at least in part, a caching of service information determined per step 309, at the at least one device 107a-107i.

In one embodiment, the service information, determined per step 309, includes at least in part, recommendation information generated based, at least in part, on one or more recommendation technologies associated with the one or more components of cloud 111a-111n, the at least one device 107a-107i, or a combination thereof.

In one embodiment, the service information is generated using one or more resources of the one or more components of cloud 111a-111n, and cached at a data persistence layer of the one or more components of cloud 111a-111n.

In one embodiment, the caching of the service information, determined per step 309, is performed preemptively based, at least in part, on the one or more future events, determined per step 307.

In one embodiment, per step 313 of FIG. 3, the notification module 209 determines whether at least one notification has been received. A notification may indicate availability, update, or a combination thereof of the user information, the service information, or a combination thereof.

If at least one notification has been received, per step 315 of FIG. 3, the notification module 209 causes, at least in part, an initiation of the processing of the one or more data propagation policies, the one or more data caching policies, or a combination thereof by the propagation/cache module 205, based, at least in part, on the at least one notification.

In one embodiment, the service information, determined per step 309, specifies, at least in part, one or more user interface elements of UI 109a-109i for causing, at least in part, a presentation of the service information at the at least one device 107a-107i.

Figure 4:
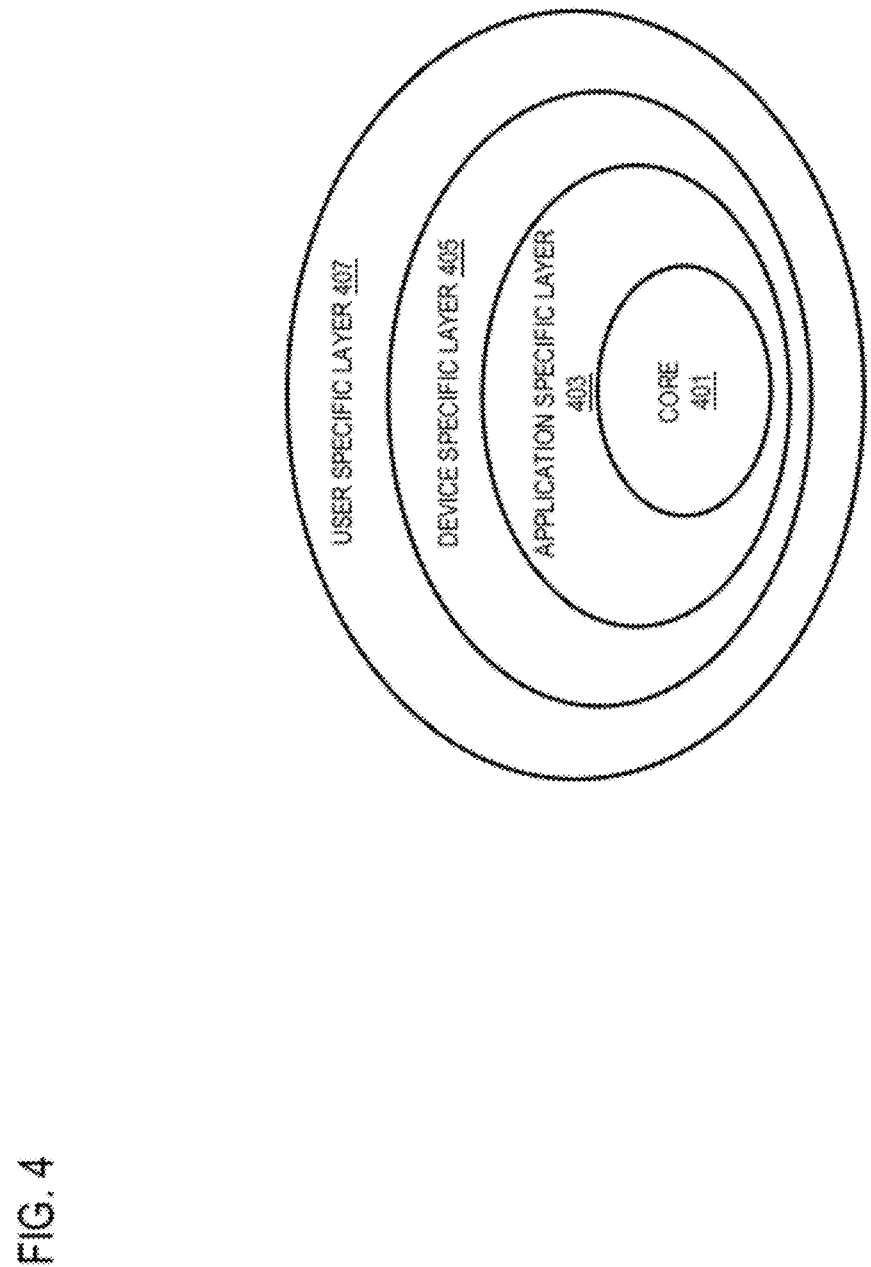
FIG. 4 is a diagram of policy layers, according to one embodiment.

FIG. 4 is a diagram of policy layers, according to one embodiment. In one embodiment, a UE 107a-107i is able to cache certain types of data to be available for use at offline situation.

It is noted that a manufacturer of a UE 107a-107i may provide top level or core policies 401 about the types of core data necessary to drive a user experience, based on the manufacturers design, policy, etc. The core policies may be applied to, for example, phone books, contact information, etc. which are always present at the device 107a-107i, but independent from any specific device configurations.

In one embodiment, the application specific layer 403, includes policies associated with applications and domains related to the UE 107a-107i. The application specific policies of layer 403 supplement the core policies 401.

In one embodiment, the device specific layer 405 may include certain policies associated with the device type for UE 107a-107i and certain capabilities of the device 107a-107i.

In one embodiment, the user specific layer 407 includes user specific policies and acts as an interface that allows a user of UE 107a-107i to modify lower layers 401, 403, and 405.

In one embodiment, the user specific policies of layer 407 which are generated by the user reside in the persistent layer of a cloud 111a-111n. In this case, if a user owns more than one device 107a-107i, the user will be able to apply the user specific policies to more than one device through cloud 111a-111n.

Figure 5A:
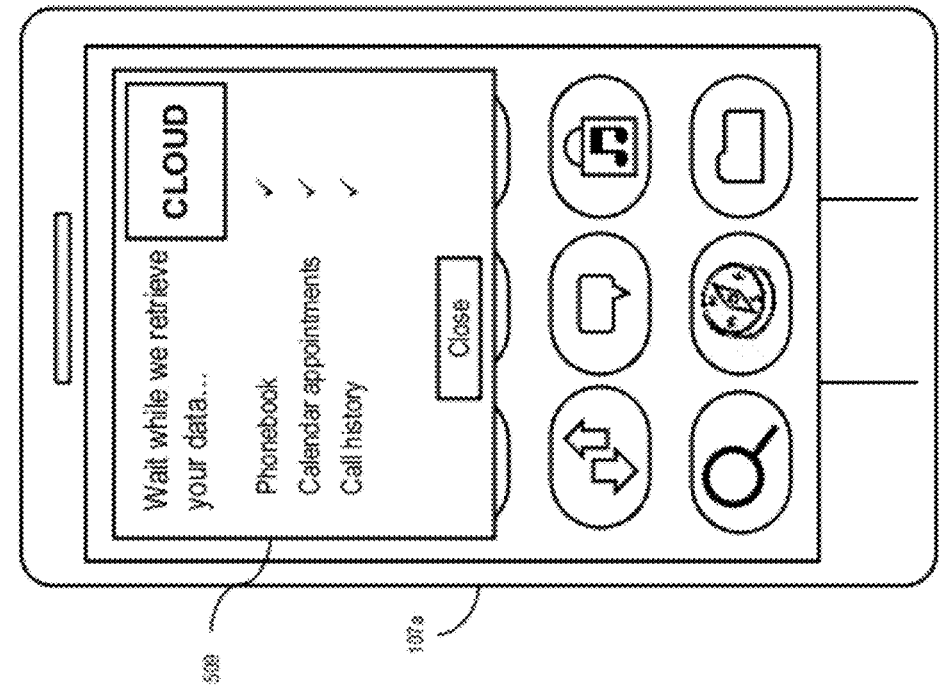
FIGS. 5A-5F are diagrams of application and service launch, according to various embodiments.
Figure 5B:
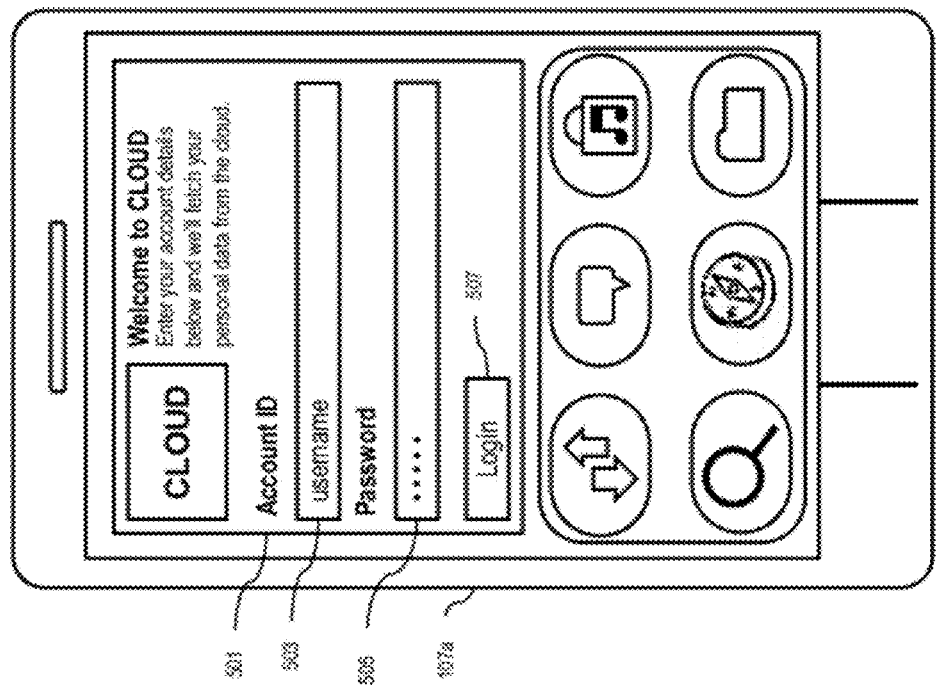

FIGS. 5A-5F are diagrams of application and service launch, according to various embodiments. In one embodiment, as seen in FIG. 5A, a user of UE 107a launches an application for the first time. The user may do so by clicking on the application icon from list 509 on a keypad or on a UI 109a of UE 107a. Upon selection of the application, the login screen 501 appears on the UI 109a for the user to provide an ID 503 and password 505 in order to be verified and signed in to the cloud 111a-111n. The user then enters the login credentials and presses login button 507. A backup server authenticates the credentials and the application retrieves the data from the cloud 111a-111n as shown in screen 509 of FIG. 5B.

In one embodiment, upon the entry of ID 503 and password 505 by the user, a screen 509 is displayed on the UI 109a-109i, informing the user about the applications that are being initiated. The screen 509 may also display information that is being propagated from UE 107a to cloud 111a-111n (e.g., user information provided to the applications or services requested by the user), cached from cloud 111a-111n to UE 107a (e.g., service or application information), or a combination thereof.

In one embodiment, an application 117a-117i, an application provided by cloud 111a-111n, or a combination thereof, may store the login credentials entered by the user in a secure location on the UE 107a-107i, on the cloud or a combination thereof. The application may use the stored credentials for subsequent launches. The applications may also provide a mechanism to clear the stored credentials, in case the UE 107a-107i is being transferred to a different user.

In one embodiment, the information provided by cloud 111a-111n (e.g., contact lists) can be presented to a user via a UE 107a-107i by providing various visualizations such as for example, alphabetical lists (traditional method), people more likely to contact the user on top of the list, recommended list of people the user may know and may want to add to their contact list, visualization of participating contacts overlaid on a map, etc., or a combination thereof.

Figure 5D:
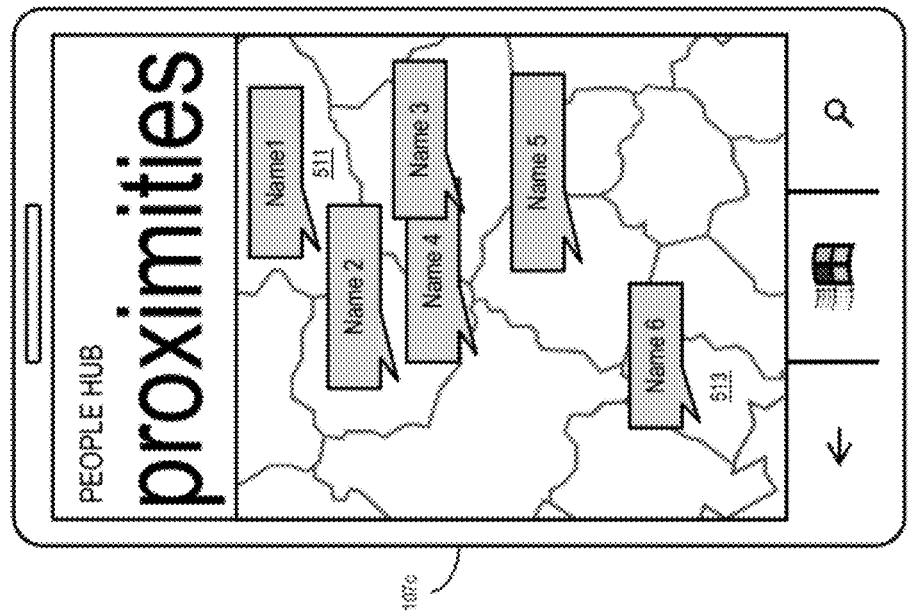
Figure 5C:
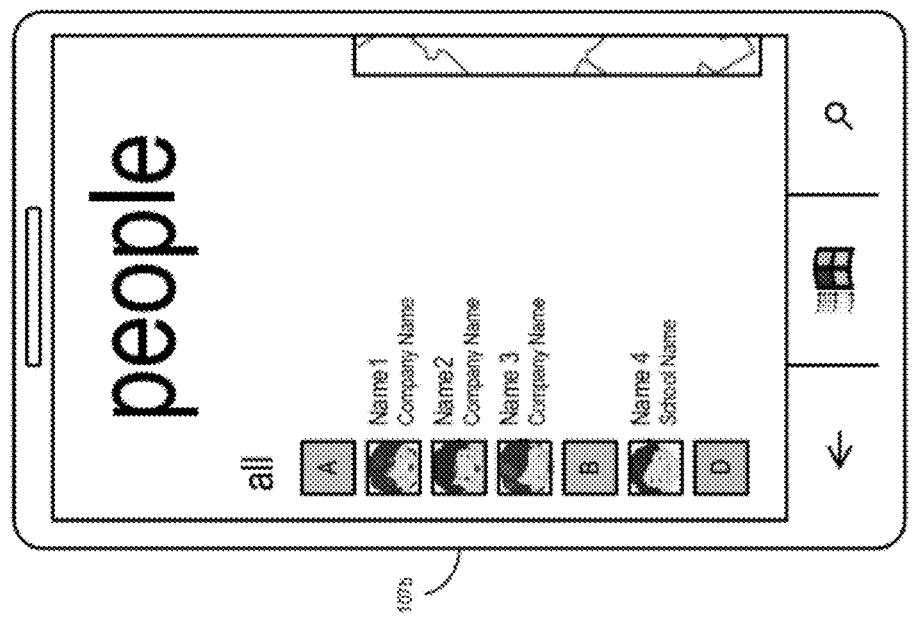

In one embodiment, the list of contacts of UE 107b in FIG. 5C, is based on alphabetical order. This is the normal sorted list view, where the contacts are sorted according to the last or first name. The details (e.g., company name) along with the thumbnails can be pulled down from the cloud 111a-111n.

In one embodiment, the contact list can be visualized overlaid on a map as seen in UE 107c of FIG. 5D. The same list that is presented in alphabetic order can be laid out on a map in order to show the proximity of contacts, for example the contact Name 1 in area 511, while Name 6 is located in area 513. This is possible as each UE 107a-107i participating in the proximity service, sends their location information to the cloud 111a-111n. The cloud 111a-111n then collates the information and sends the locations of the contacts to the requesting device 107c.

In one embodiment, a mapping application 117a-117i receives the contact information and plots the contacts on a map and displays the map on the UI of UE 107c as seen in FIG. 5D. Subsequently, the user of UE 107c can select a particular name (e.g., Name 1) to open the contact details. This view gives the user an opportunity to communicate based on location.

Additionally, an application may backup the entries of the contact list along with user's calendar entries to the cloud 111a-111n. This enables the user to share the contacts and calendar entries among multiple devices 107a-107i owned by the same owner. Furthermore, the user will be able to access and edit the contacts and calendar entries online.

In one embodiment, if a UE 107a-107i is lost or misplaced, the user can retrieve the contacts and calendar entries from the cloud 111a-111n.

In another embodiment, availability of location information for participating users, at the cloud 111a-111n enables applications to alert the user if a contact's location changes. Furthermore, discovery of who is nearby creates opportunities to socialize.

Figure 5F:
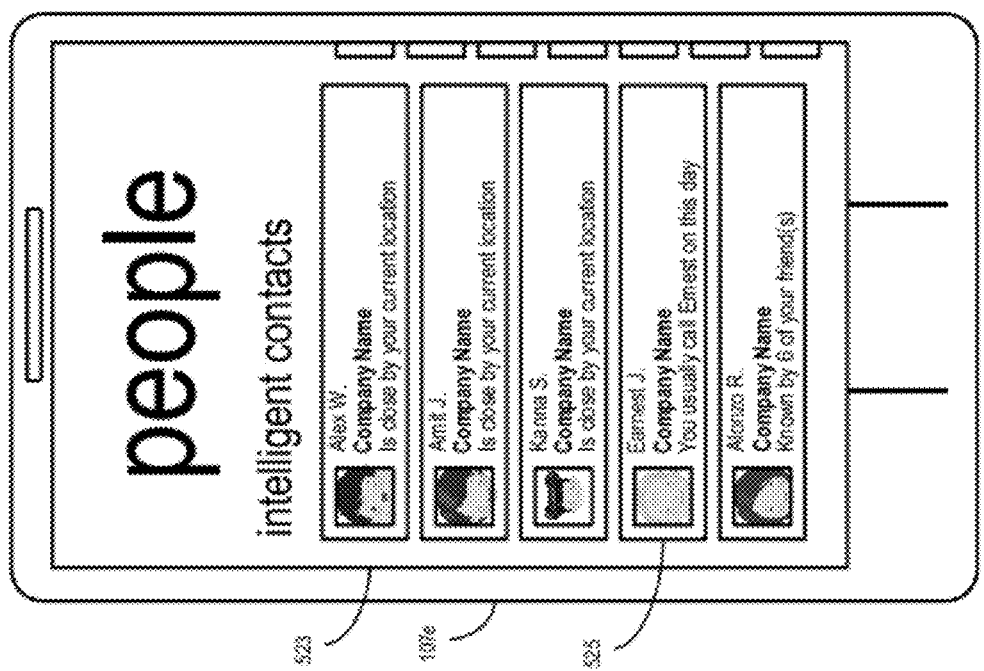
Figure 5E:
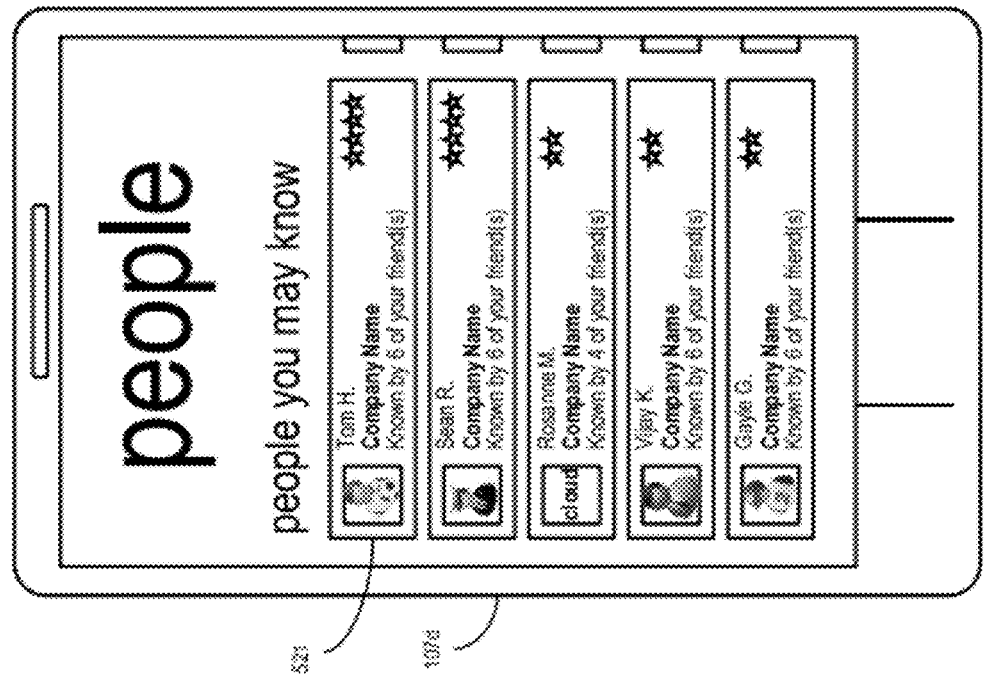

In one embodiment, intelligent contact application, as described, leverages the computation power of the cloud 111a-111n to run algorithms on the data it gathers from the participating devices 107a-107i to provide value to the user. One such value is to suggest to the user other users he/she may know based on the analysis of his/her contact entries by the analytics platform 103. The application suggests contacts that the user may know and also a rating of the level of confidence with which the recommendation is made. A screen shot is shown in FIG. 5E, wherein other users with higher probability of being known by the user of UE 107d appear closer to the top of recommendation list 521. The number of stars in front of each name may represent a collective measure based on user information (e.g., affiliation, home address, schools attended, age, interests, career type, etc.) that shows the probability of the user of UE 107d knowing the user listed in list 521.

In one embodiment, the recommendations are generated in the cloud 111a-111n after analysis of the user data in the cloud by the analytics platform 103. By harnessing the computation power of the cloud 111a-111n, the algorithms of applications 117a-117i detect calling patterns such as most frequently called contact, contact called frequently at a given day and time, etc. For example, a user A may call a contact B every Friday at 3 pm. As a result of this pattern, every Friday after 2:30 PM when user A starts the related application 117a-117i, the contact B will be displayed higher up in the list. FIG. 5F shows an screen shot of this intelligent contact list, wherein contacts. A screenshot is shown in FIG. 5F, wherein the list 523 of contacts on a UI 109a-109i of UE 107e is presented based on patterns found in user information by the analytics platform 103.

In one embodiment, an application presents to the user, via a cloud 111a-111n, a list of contacts the user is most likely to contact at a given day and time. The user receives a list of contact 523, with a reason as to why the contact has been recommended (e.g., "you usually call this person on this day") as seen on row 525 of the display of FIG. 5F.

In one embodiment, the suggestions may be based on the data inputs such as, for example, call log, location information, calendar events, or a combination thereof. The call log is the history of calls the user of UE 107a-107i has made in the past. This is used to detect calling patterns and suggest contacts based on who the user calls frequently and at a particular time. The location information shows the location of all the contacts in the address-book. This information is used to suggest contacts if they are nearby or if their location has changed with respect to the user's current location. The calendar events shows events such as meetings, invites, etc. This information is used to suggest contacts with whom the user has an upcoming meeting.

Figure 6:
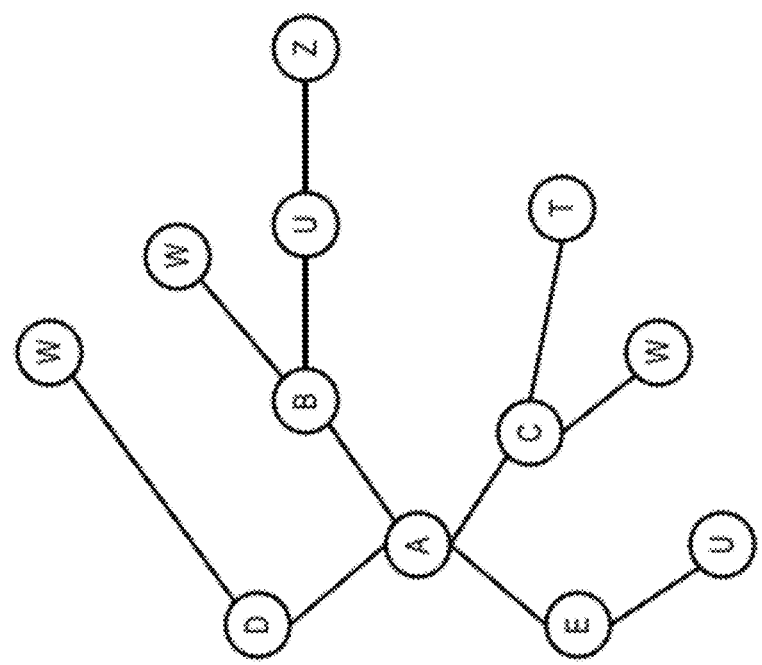
FIG. 6 is a diagram of recommendation determination, according to one embodiment.

FIG. 6 is a diagram of recommendation determination, according to one embodiment. In one embodiment, the recommendations are generated by running a graph traversal algorithm in the analytics platform 103. FIG. 6 shows a representation of the algorithm.

In one embodiment, user A has users B, C, D and E as his contacts. Furthermore, users D, B and C have W as their contact. Therefore, there is a good possibility that user A may be interested in having user W as his contact (shown with a 75% weight in recommendation table 601). Similarly, user U with two common contacts B and E with user A is the second most possible recommendation for user A (shown with a 50% weight in recommendation table 601) and user T with one common contact with user A is the third recommended contact to user A (shown with a 25% weight in recommendation table 601). However, the recommendation weight for user Z may be too low for user Z to be recommended as a contact to user A.

In one embodiment, the analytics and related algorithms in analytics platform 103 can be enhanced and updated based on feedback. However, since the algorithms and analytics are managed separately from UEs 107a-107i, the algorithm updates will not require a device software update.

The processes described herein for providing services via cloud based analytics may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
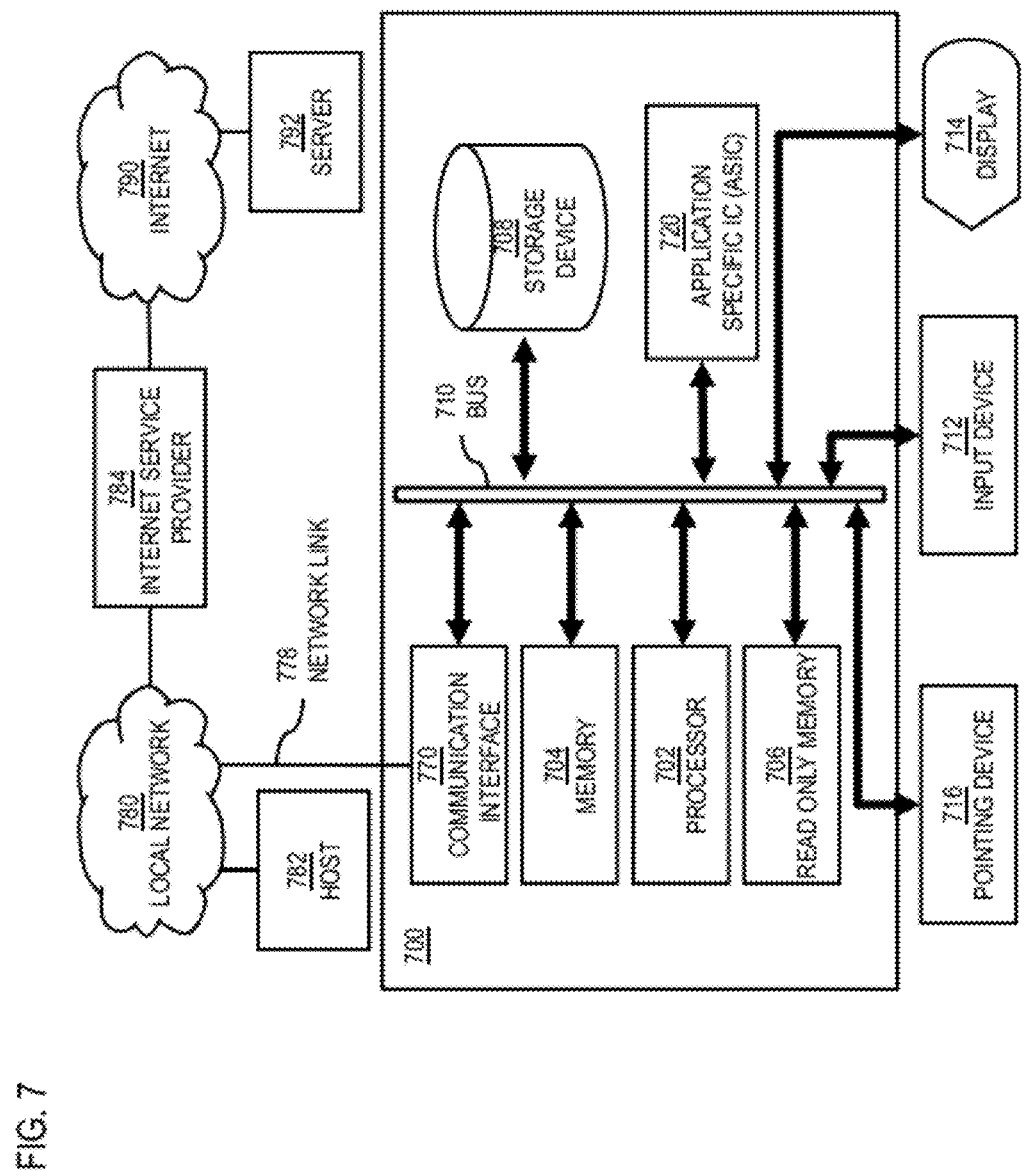
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide services via cloud based analytics as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing services via cloud based analytics.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing services via cloud based analytics. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing services via cloud based analytics. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing services via cloud based analytics, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing services via cloud based analytics to the UEs 107a-107i.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide services via cloud based analytics as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing services via cloud based analytics.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide services via cloud based analytics. The memory 805 also stores the data associated with or generated by the execution of the inventive steps.

Figure 9:
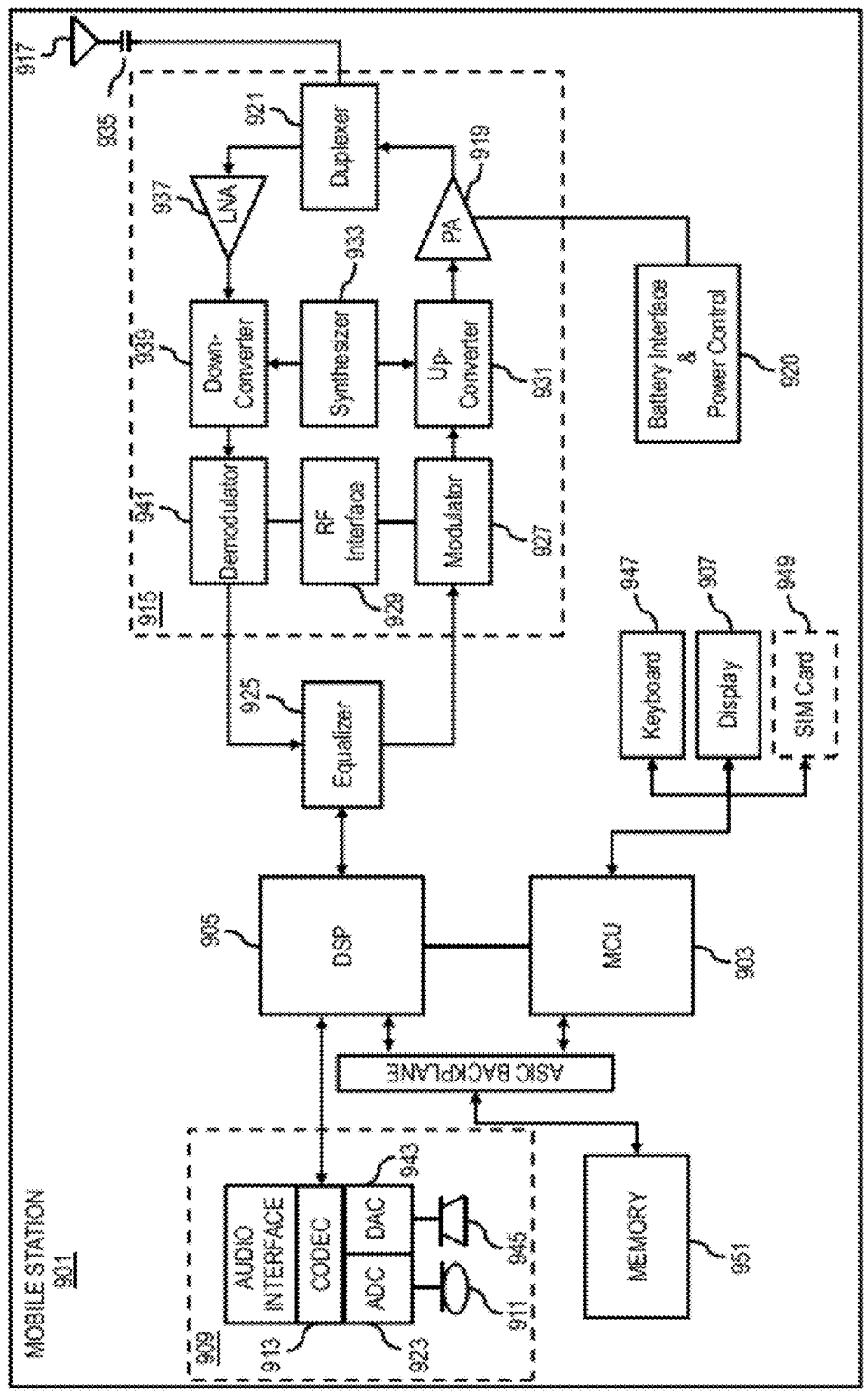
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing services via cloud based analytics. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing services via cloud based analytics. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide services via cloud based analytics. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by an apparatus, one or more data propagation policies associated with propagating user information from at least one device to a plurality of cloud components of cloud services;
    processing, by the apparatus, the one or more data propagation policies to cause, at least in part, a propagation of the user information to the one or more cloud components, wherein the propagation causes, at least in part, the user information to be available to one or more applications, one or more services, or a combination thereof;
    determining, by the apparatus, one or more data caching policies;
    receiving, by the apparatus, additional user information collected by a plurality of independent collecting entities of the cloud services across a plurality of data domains of service providers, websites, or a combination thereof;
    analyzing, by the apparatus, the user information and the additional information to determine service information specific to a user of the at least one device;
    processing, by the apparatus, the one or more data caching policies to determine one or more rules, one or more criteria, or a combination thereof, to initiate a caching of the service information at the at least one device, wherein the one or more rules, the one or more criteria, or a combination thereof are based, at least in part, on one or more data types, one or more propagation types, network availability information, resource availability information, device capability information, temporal information, or a combination thereof,
    wherein the service information includes, at least in part, recommendation information generated specifically for the user and an application across the plurality of data domains.

2. A method of claim 1, wherein the one or more data propagation policies, the one or more data caching policies, or a combination thereof are independent of the one or more applications, the one or more services, or a combination thereof, and the one or more data propagation policies describe a kind of user information that is propagated to the one or more cloud components,
    wherein the additional user information is received at the apparatus via one or more live information streams.

3. A method of claim 1, further comprising:
    processing the one or more data propagation policies to determine one or more rules, one or more criteria, or a combination thereof for the propagation,
    wherein the one or more rules, the one or more criteria, or a combination thereof are based, at least in part, on one or more data types, one or more propagation types, one or more network interactions, network availability information, resource availability information, device capability information, temporal information, or a combination thereof.

4. A method of claim 1, further comprising:
    processing the user information to determine one or more future events,
    wherein the caching is performed preemptively based, at least in part, on the one or more future events.

5. A method of claim 1, further comprising:
    initiating at least one notification of an availability, an update, or a combination thereof of the user information, the service information, or a combination thereof, wherein the one or more data propagation policies, the one or more data caching policies, or a combination thereof is processed based, at least in part, on the at least one notification.

6. A method of claim 1, wherein the service information is generated using one or more resources of the one or more cloud computing components, and cached at a data persistence layer of the one or more cloud computing components.

7. A method of claim 1, wherein the service information includes a plurality of recommendations for the user when using the application, and the method further comprising:
    when determining the application is activated, initiating, at the at least one device, a presentation of a rating of a level of confidence of each of the recommendations and the recommendations listed in an order of the rating.

8. A method of claim 7, wherein the one or more cloud components include, at least in part, one or more information spaces, and wherein the recommendations include a plurality of recommended contacts or a plurality of recommended routes.

9. A method of claim 7, wherein the rating of a level of confidence is made based on one or more user organizational affiliations, one or more user addresses, a user age, one or more user interests, one or more user careers, or a combination thereof.

10. A method of claim 8, wherein the recommended contacts include a list of nearby contacts, a list of frequently called contacts, a list of contacts called frequently at a given day and time, or a list of contacts in an upcoming meeting.

11. An apparatus comprising:
at least one processor; and
at least one memory including computer program code for one or more programs, the at least one memory and the computer program code configured to, with the at least one processor, cause the apparatus to perform at least the following,
  determine one or more data propagation policies associated with propagating user information from at least one device to a plurality of cloud components of cloud services;
  process the one or more data propagation policies to cause, at least in part, a propagation of the user information to the one or more cloud components, wherein the propagation causes, at least in part, the user information to be available to one or more applications, one or more services, or a combination thereof;
  determine one or more data caching policies;
  receive additional user information collected by a plurality of independent collecting entities of the cloud services across a plurality of data domains of service providers, websites, or a combination thereof;
  analyze the user information and the additional information to determine service information specific to a user of the at least one device;
  process the one or more data caching policies to determine one or more rules, one or more criteria, or a combination thereof, to initiate a caching of the service information at the at least one device, wherein the one or more rules, the one or more criteria, or a combination thereof are based, at least in part, on one or more data types, one or more propagation types, network availability information, resource availability information, device capability information, temporal information, or a combination thereof,
  wherein the service information includes, at least in part, recommendation information generated specifically for the user and an application across the plurality of data domains.

12. An apparatus of claim 11, wherein the one or more data propagation policies, the one or more data caching policies, or a combination thereof are independent of the one or more applications, the one or more services, or a combination thereof, and the one or more data propagation policies describe a kind of user information that is propagated to the one or more cloud components.

13. An apparatus of claim 11, wherein the apparatus is further caused to:
  process the one or more data propagation policies to determine one or more rules, one or more criteria, or a combination thereof for the propagation,
  wherein the one or more rules, the one or more criteria, or a combination thereof are based, at least in part, on one or more data types, one or more propagation types, one or more network interactions, network availability information, resource availability information, device capability information, temporal information, or a combination thereof.

14. An apparatus of claim 11, wherein the apparatus is further caused to:
  process the user information to determine one or more future events,
  wherein the caching is performed preemptively based, at least in part, on the one or more future events.

15. An apparatus of claim 11, wherein the apparatus is further caused to:
  receive at least one notification of an availability, an update, or a combination thereof of the user information, the service information, or a combination thereof, wherein the one or more data propagation policies, the one or more data caching policies, or a combination thereof is processed based, at least in part, on the at least one notification.

16. An apparatus of claim 11, wherein the service information is generated using one or more resources of the one or more cloud computing components, and cached at a data persistence layer of the one or more cloud computing components.

17. An apparatus of claim 11, wherein the service information specifies, at least in part, one or more user interface elements for causing, at least in part, a presentation of the service information at the at least one device.

18. An apparatus of claim 11, wherein the one or more cloud components include, at least in part, one or more information spaces.

19. An apparatus of claim 11, wherein the service information includes a plurality of recommended contacts for the user, and the recommended contacts include a list of nearby contacts, a list of frequently called contacts, a list of contacts called frequently at a given day and time, or a list of contacts in an upcoming meeting.

20. An apparatus of claim 19, wherein the service information further includes a rating of a level of confidence for each of the recommended contacts.

* * * * *